United States Patent

[11] 3,564,203

| [72] | Inventors | Akisada Naoi<br>Tokyo;<br>Masaaki Kubo, Funabashi-shi, Japan |
|---|---|---|
| [21] | Appl. No. | 830,380 |
| [22] | Filed | June 4, 1969 |
| [45] | Patented | Feb. 16, 1971 |
| [73] | Assignee | Hitachi Heating Appliance Co., Ltd.<br>Tokyo, Japan<br>a corporation of Japan |
| [32] | Priority | June 5, 1968 |
| [33] | | Japan |
| [31] | | 43/38022 |

[54] AUTOMATIC TEMPERATURE CONTROL DEVICE FOR ELECTRIC BLANKET
3 Claims, 6 Drawing Figs.

[52] U.S. Cl. .................................................. 219/491,
219/212, 219/501
[51] Int. Cl. ........................................................ H05b 1/02
[50] Field of Search ............................................ 219/491,
493, 501, 504, 505, 519, 212

[56] References Cited
UNITED STATES PATENTS

| 3,431,400 | 3/1969 | Takahko Iida et al. | 219/501 |
|---|---|---|---|
| 3,462,585 | 8/1969 | Somers | 219/501 |
| 3,360,693 | 12/1967 | Fickweiler | 219/494X |
| 3,270,184 | 8/1966 | Negromanti | 219/501 |

Primary Examiner—Bernard A. Gilheany
Assistant Examiner—F. E. Bell
Attorney—Craig, Antonelli, Stewart & Hill ABSTRACT: Improvements of the automatic temperature control device in an electric blanket for ordinary household use, removing troubles and high cost caused by employing a delicate relay, premature deterioration of a heat-sensitive layer, inconvenience in reheating after breaking of a switch due to abnormal overheating of a heating wire, etc. by means of an improved automatic control device.

INVENTORS
AKISADA NAOI and MASAAKI KUBO

BY Craig, Antonelli, Stewart & Hill
ATTORNEYS 3,564,203

AUTOMATIC TEMPERATURE CONTROL DEVICE FOR ELECTRIC BLANKET

The present invention relates to improvements in the automatic temperature control device for electric blankets commonly used in households.

An ordinary electric blanket for domestic use is, as shown in FIG. 1, composed of a blanket body 1 and a temperature control device 2 for adjusting the temperature of said blanket body, and the blanket body 1 has incorporated therein a heat-sensitive heating wire of the structure as shown in FIG. 2. Namely, the heat-sensitive heating wire comprises a flexible, electrically insulating core 3 of glass fiber or the like, a heating wire 4 wound around said core 3, a heat-sensitive layer 5 surrounding said heating wire, said heat-sensitive layer consisting of a flexible organic material, such as nylon, which has such property that the resistance value thereof decreases with temperature increase, a signal wire 6 wound around said heat-sensitive layer 5 and an electric insulation coating 7 covering said signal wire 6. As is already known, the resistance value of the heat-sensitive layer 5 varies with respect to temperature, for example, in a way as shown in FIG. 3 when the length of said layer is 34 meters. A conventional temperature control device of the electric blanket incorporating such a heat-sensitive heating wire as described above, consists of a heating wire circuit comprising the heating wire 4 and a make-and-break contact connected with each other in series, and a signal wire circuit comprising the signal wire 6, a rectifier, a relay for opening and closing said make-and-break contact and an on–off switch to be closed only at the start of heating, all of which are connected with each other in series, the arrangement being such that when the on–off switch is turned on, with said respective circuits connected with a power source, a direct current flows to the relay through the rectifier and thereby the make-and-break contact is closed permitting the current to flow through the heating wire 4 to heat the same. In this case, the relay current is on the order of 0.45 ma. Thereafter, if the ambient temperature of the heating wire has risen abnormally for some reason and reached about 120° C., placing the blanket in a dangerous condition, the resistance value of the heat-sensitive layer 5 decreases below 1 MΩ as shown in FIG. 3, so that the direct current passing through the relay decreases to 0.3 ma. due to leakage or an alternating current is superimposed on the relay, with the result that the make-and-break contact is opened to interrupt the current supply to the heating wire 4 and thus the blanket is relieved from the dangerous condition.

However, such a conventional device, including the relay which is required to be relatively precise in operation, i.e. to be operative, for example, with a current of about 0.3 ma., has the disadvantages that the relay tends to be a cause of malfunction of the device and that the use of such relay adds to the cost of the device. There is another disadvantage that the heat-sensitive layer 5 is prematurely deteriorated as a result of being subjected to high temperatures since the relay is not actuated until the temperature of said heat-sensitive layer 5 reaches 120°—140° C. A further disadvantage of the conventional device is that since the make-and-break contact, once opened upon abnormal overheating of the heating wire 4, is not closed even when the ambient temperature of said heating wire has fallen to room temperature, the user of the electric blanket must actuate the on-off switch for reheating of the blanket.

The present invention has been achieved with a view to obviating the foregoing disadvantages of the conventional automatic control device. Namely, an object of the present invention is to provide an automatic control device for use with an electric blanket, which is so designed that a heating circuit is opened at a lower temperature than in the conventional device in an abnormally overheated condition of the blanket body and which, therefore, is safe and durable as compared with the conventional one.

Another object of the invention is to provide an automatic control device for use with an electric blanket, which is so constructed as to enable a relay to be used which is operationally less sensitive and mechanically stronger, that is, less expensive and more stable in operation, than that used in the conventional device.

Still another object of the invention is to provide an automatic control device for use with an electric blanket, which is so se designed that heating is automatically restarted when the blanket is cooled from an overheated temperature to normal temperature and which, therefore, is highly convenient in use.

These and other objects, features and advantages of the present invention will be apparent from the following description taken in conjunction with the accompanying drawings, in which.

Figure 2:
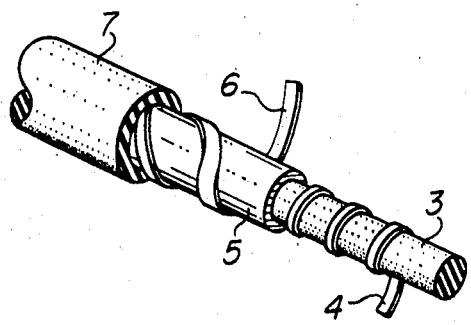
FIG. 2 is a fragmentary perspective view, partly broken away, of a heat-sensitive heating wire incorporated in the body of the electric blanket shown in FIG. 1.
Figure 3:
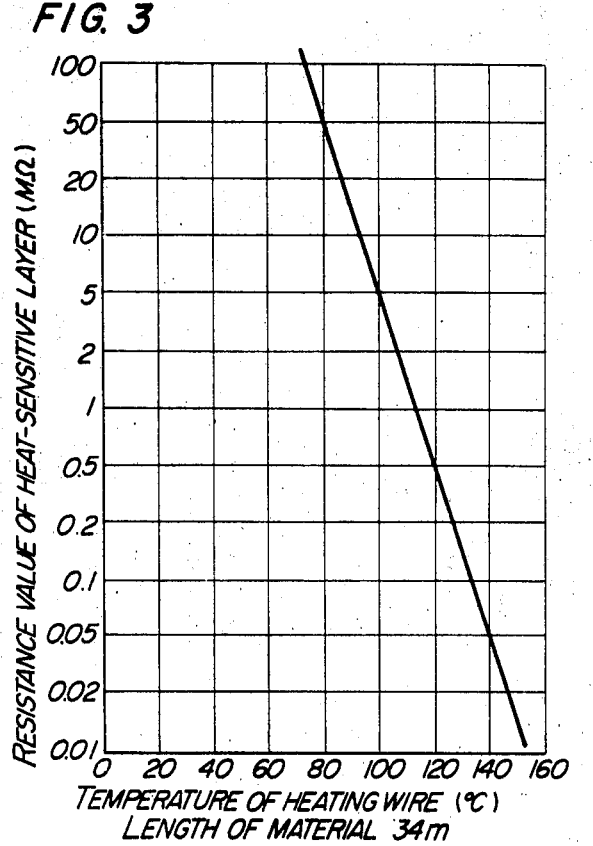
FIG. 3 is a diagram graphically showing the relationship between the resistance value and the temperature, of a heat-sensitive layer formed in the heat-sensitive heating wire of FIG. 2, when the length of said heat-sensitive layer is 34 meters.
Figure 4:
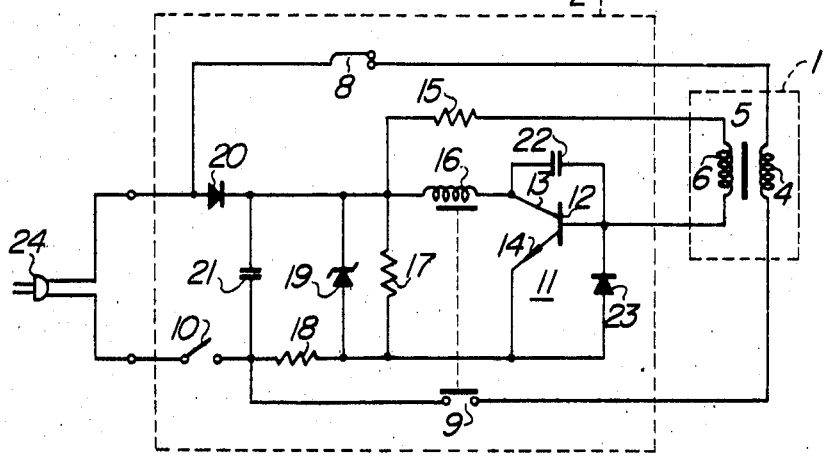
FIG. 4 is an electric circuit diagram of a control device according to the present invention.

The electric circuit of the automatic control device according to the present invention is arranged as shown in FIG. 4. A heat-sensitive heating wire, including a heating wire element, which is to be incorporated in the body of a blanket 1 is constructed as shown in FIG. 2 and its characteristic is shown in FIG. 3. Namely, the heating wire used is of a known type as stated previously.

Figure 1:
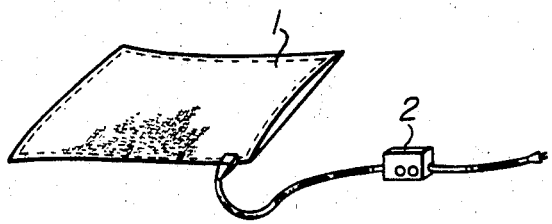
FIG. 1 is an overall view of an electric blanket according to the present invention.

A temperature control device 2 consists mainly of a transistor amplifier and is set in a casing by suitable means. The body of the blanket 1 and the temperature control device 2 are connected with each other in a spaced relation as shown in FIG. 1, in consideration of resistance to heat and easiness in handling. The opposite ends of the heating wire 4 are connected with the control device 2 with two lead wires and thence with a plug 24 through a bimetallic temperature controller 8 of the type well known in the art, a make-and-break contact 9 to be opened and closed by a relay 16 and an on–off switch 10, said plug 24 being connected to a power source. The opposite ends of a signal wire 6 are connected with a resistor 15 and the base terminal 12 of a silicon transistor 11 respectively with two lead wires and the other end of the resistor 15 is connected with one end of an output bias resistor 17, to form an input bias circuit. Between the collector terminal 13 and the emitter terminal 14 of the silicon transistor 11 are connected, in series with respect to the relay 16, a parallel circuit consisting of the output bias resistor 17 and a constant-voltage element 19 so as to form an output circuit. That end of the output bias resistor 17 which is connected to the emitter terminal of the silicon transistor 11 is also connected to one end of the on–off switch 10 and one end of a filter condenser 21 through a power dividing resistor 18 and the other end of the on–off switch 10 is connected with one pole of the plug 24. The other end of the output bias resistor 17 is connected with the other end of the filter condenser 21 and one pole of a rectifier 20, and the other pole of said rectifier 20 is connected with the other pole of the plug 24. A condenser 22 is connected between the base terminal 12 and the collector terminal 13 of the transistor 11 for bypassing alternating current, whilst another rectifier 23 is connected between the base terminal 12 and the emitter terminal 14 of the transistor 11 in a direction opposite to the flow direction of the current. The rectifier 20 may be of various types and the filter condenser 21 may be omitted depending upon the type of the rectifier used. The bypass condenser 22 and the power dividing resistor 18 may also be eliminated under a certain condition.

Now, the operation of the present device will be briefly explained hereunder:

First of all, the plug 24 is connected to a power source of 100—110 v. alternating current for domestic use and then the on—off switch 10 is closed, whereupon a direct current flows through the resistors 17, 18 via the rectifier 20 and at the same time a base bias current is impressed on the base terminal 12 of the transistor 11 through the resistor 15 and the signal wire 6. The collector current of the transistor 11 flows through the relay 16 and thereby the make-and-break contact 9 is closed permitting the current to be supplied to the heating wire 4. Thus, the heating wire 4 begins to generate heat.

Thereafter, the temperature of the blanket body 1 is set as at a desired level by suitably adjusting the quantity of electricity supplied to the heating wire by means of the bimetallic temperature controller 8. In normal use, the blanket body is maintained at about 60° C. and in this case the resistance value of the heat-sensitive layer 5 is not smaller than 100 MΩ and the collector current is 5 ma. in the embodiment shown.

Now, if the temperature of the heating wire 4 becomes abnormally high for some reason, endangering the user of the blanket, the temperature of the heat-sensitive layer 5 also rises and the resistance value thereof decreases, for example, below 1 MΩ at 120° C. as shown in FIG. 3, so that the aforesaid base current leaks through said heat-sensitive layer 5. Consequently, the collector current also decreases causing the relay 16 to open the make-and-break contact 9 and thus the heating wire 4 stops generating heat. The collector current in this case is not greater than 2 ma. When the heat-sensitive sensitive layer 5 is cooled to normal temperature of 60° C., its resistance value again increases to 100 MΩ or greater, so that the collector current is restored and the make-and-break contact 9 is opened by the relay 16.

In the present device, as described above, it is possible to use a relay which is capable of opening the make-and-break contact with a current of 2 ma. and maintaining the same with a current of 5 ma. Therefore, the device is stable in operation and cheaper as compared with the conventional one. Moreover, with the present device, automatic restoration of the blanket is possible because the heating wire automatically starts heating when the blanket body has been cooled to normal temperature after to the contact was opened as a result of abnormal overheating of said blanket body.

Figure 5:
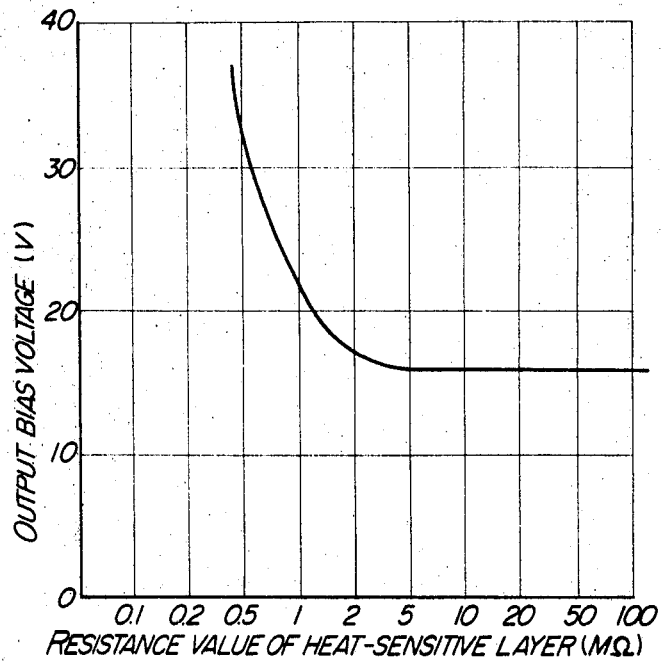
FIG. 5 is a diagram graphically showing the relationship between the resistance value and the output bias voltage, of the heat-sensitive layer of FIG. 4.

Next, the function and effect of the constant-voltage element 19 (a Zener diode in the embodiment shown) used used in the present device will be explained. Generally, in this type of transistor amplifier circuit, if the diode 19 is not used, there occurs a phenomenon in which the voltage across the terminals of the output bias resistor 17 rises and the voltage across the terminals of the resistor 18 drops as the temperature of the heat-sensitive layer 5 is elevated by the heat of the heating wire 4, with its resistance value decreasing, as shown in FIG. 5. Such phenomenon renders the operation of the device unstable. The relationship between the collector current and the voltage across the terminals of the respective resistors is represented by the following equation:

$$Ic = h_{FE} \left( \frac{V_1}{R_{15}} - \frac{V_2}{R_5} \right)$$

wherein
Ic = collector current
$R_5$ = resistance value of the heat-senstive layer 5
$h_{FE}$ = $_{current\text{-}amplification\ factor}$ 100 (constant)
$R_{15}$ = 300 KΩ (constant)
$V_1$ = voltage across the terminals of the output bias resistor 17
$V_2$ = voltage across the terminals of the dividing resistor 18

The constant-voltage diode 19 is to maintain the values of $V_1$ and $V_2$ in the above equation constant irrespective of the variable value of $R_5$ and, in the embodiment shown, a Zener diode is connected in parallel with the resistor 17 to control the voltage of $V_1$, for example, below 19 so as to obtain the effect to be described hereinafter. In the embodiment of the invention shown in FIG. 4, the heat-sensitive layer 5 consists of nylon or other known material (the characteristic of which is shown in FIG. 3); the resistors 15, 17 and 18 are of a resistance value of 300 KΩ, 7 KΩ and 11 KΩ respectively; the transistor 11 is of the silicon type having a current amplification factor of 100; and the relay 16 is of the type which is designed to open the make-and-break contact 9 when the collector current Ic is decreased to 2 ma. or smaller. Suppose that the heating wire 4 is abnormally overheated during normal use of the blanket with the present device connected with a 100v. alternating current power source and as a result the collector current Ic has decreased from 5 ma. to below 2 ma. causing the relay 16 to open the make-and-break contact 9. The values of the respective terms of the above equation, in this case, are shown in a table below in comparison of the case when the constant-voltage diode 19 is used with the case when such diode is not used:

| | Constant-voltage diode used | Not used |
|---|---|---|
| Ic | 2 ma | 2 ma. |
| $R_5$ | 500KΩ–700KΩ | 2MΩ–4MΩ. |
| $V_1$ | 35V | 19V. |
| $V_2$ | 94V | 110V. |

As may be clearly understood from the values shown above, when the value of $V_1$ is controlled to be constant, the same collector current Ic can be obtained for the resistance value $R_5$ of the heat-sensitive layer 5 several MΩ higher than when the value of $V_1$ is not so controlled. This means as is apparent from the resistance vs. temperature characteristic shown in FIG. 3 that the relay 16 is actuated at a lower temperature of the heat-sensitive layer 5 and the safety of the device is increased accordingly. Furthermore, since the transistor 11 is energized at a constant value of $V_1$ which is as low as 19 v., the transistor may be one which has a lower withstand voltage characteristic and is cheaper than that used in the conventional devices. Although in the embodiment shown use is made of a Zener diode as the constant-voltage element, diodes of the other types may also be used as will be obvious to those skilled in the art.

Next, the function and effect of the rectifier 23 will be explained which is connected between the base terminal 12 and the emitter terminal 14 of the silicon transistor 11 in a direction opposite to the direction of current flow.

Figure 6:
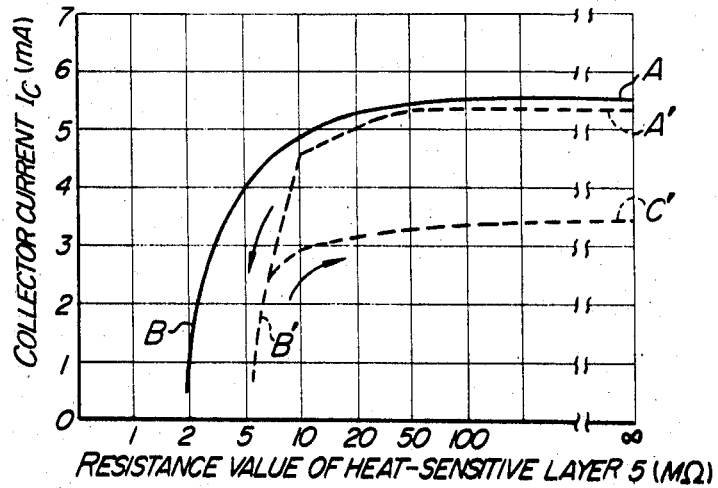
FIG. 6 is a diagram graphically showing the relationship between the resistance value and the collector current, of the heat-sensitive layer of FIG. 4.

As described previously, the resistance value of the heat-sensitive layer 5 is 100 MΩ or higher and the collector current Ic is about 5 ma. when the electric blanket is heated at the normal use temperature which is about 60° C. but said resistance value decreases to 1 MΩ or lower and said collector current Ic decreases to 2 ma. or smaller when the blanket is abnormally heated to higher temperatures. In this case, it is desirable from the standpoint of stable operation of the relay that the collector current Ic varies always at a constant rate relative to a change in the resistance value of the heat-sensitive layer 5. The relationship between the collector current and the resistance value of the heat-sensitive layer 5 is represented by a curve A—B in FIG. 6. The primary object of the rectifier 23 used in the present device is to effectively maintain such a relationship. If the present device were to be provided with no such rectifier 23, like the amplifier circuit of the conventional devices, the relationship between the collector current and the resistance value of the heat-sensitive layer 5 would change as represented by the dotted lines A'B'c' in FIG. 6. Namely, the collector current Ic sharply decreases to B' when the resistance value of the heat-sensitive layer 5 initially decreased from 100 MΩ or higher to 10 MΩ, and increases to 3 ma. but not to the original level even when the resistance value of the heat-sensitive layer 5 was thereafter increased to the original value. This is the so-called hysteresis phenomenon. The collector current after the hysteresis phenomenon is only about one-half of the original valve, which makes the relay 16 instable in its action of maintaining the make-and-break contact 9 in the closed position and thereby impairs the reliability of the device.

Another object of the rectifier 23 is to protect the silicon transistor electrically. In this type of transistor, the withstand voltage between the base terminal 12 and the emitter terminal 14 is so low that there is the danger of the transistor being broken even by a slight surge voltage imposed thereon externally. The diode 23 is provided for the purpose of absorbing such surge voltage and thereby protecting the circuit against breakage. The use of such rectifier is particularly effective for preventing breakdown of the transistor 11 and thereby prolonging the service life of the same, in the light of the fact that electric appliances, such as electric blanket, are frequently moved around during use and accordingly the opportunity of the transistor being mechanically broken is larger.

We claim:

1. An automatic temperature control device for use with an electric blanket, comprising a heating wire, a heat-sensitive layer formed over the entire length of said heating wire and consisting of a flexible solid organic material having a negative resistance temperature coefficient and adapted to become conductive to such an extent as to pass a current sufficient to cause a controlling action when heated to a certain temperature or higher, a signal wire provided opposite to said heating wire with said heat-sensitive layer intervening therebetween, a relay for operating a make-and-break contact connected in series with said heating wire, a transistor for actuating said relay, and an input and output resistors and a rectifier for said transistor, said transistor having the collector thereof connected to one end of the output resistor through the relay and the emitter thereof connected with the other end of said output resistor and the base thereof connected to the connection between said relay and said output resistor through a series circuit consisting of said signal wire and said input resistor, and said output resistor being connected to a power source through said rectifier.

2. An automatic temperature control device for use with an electric blanket, comprising a heating wire, a heat-sensitive layer formed over the entire length of said heating wire and consisting of a flexible solid organic material having a negative resistance temperature coefficient and adapted to become conductive to such an extent as to pass a current sufficient to cause a controlling action when heated to a certain temperature or higher, a signal wire provided opposite to said heating wire with said heat-sensitive layer intervening therebetween, a relay for operating a make-and-break contact connected in series with said heating wire, a transistor for actuating said relay, an input and output resistors and a rectifier for said transistor, a dividing resistor and a constant-voltage element, said transistor having the collector thereof connected to one end of the output resistor through the relay and emitter thereof connected to the other end of said output resistor and the base thereof connected to the connection between said relay and said output resistor through a series circuit consisting of said signal wire and said input resistor, and said output resistor having said constant-voltage element connected therewith in parallel and being connected to a power source through said dividing resistor and said rectifier.

3. An automatic temperature control device for use with an electric blanket, comprising a heating wire, a heat-sensitive layer formed over the entire length of said heating wire and consisting of a flexible solid organic material having a negative resistance temperature coefficient and adapted to become conductive to such an extent as to pass a current sufficient to cause a controlling action when heated to a certain temperature or higher, a signal wire provided opposite to said heating wire with said heat-sensitive layer intervening therebetween, a relay for operating a make-and-break contact connected in series with said heating wire, a transistor for actuating said relay, and an input and output resistors and a first and second rectifiers for said transistor, said transistor having the collector thereof connected to one end of the output resistor through the relay and the emitter thereof connected to the other end of said output resistor and the base thereof connected to the connection between said relay and said output resistor through a series circuit consisting of said signal wire and said input resistor, said first rectifier being connected between said base and said emitter in a direction opposite to the flow direction of the emitter current and said output resistor being connected to a power source through said second rectifier.